(12) United States Patent
Brandt et al.

(10) Patent No.: US 9,158,963 B2
(45) Date of Patent: Oct. 13, 2015

(54) FITTING CONTOURS TO FEATURES

(71) Applicant: Adobe Systems Incorporated, San Jose, CA (US)

(72) Inventors: Jonathan W. Brandt, Santa Cruz, CA (US); Zhe Lin, Fremont, CA (US); Lubomir D. Bourdev, San Jose, CA (US); Vuong Le, Urbana, IL (US)

(73) Assignee: Adobe Systems Incorporated, San Jose, CA (US)

( * ) Notice: Subject to any disclaimer, the term of this patent is extended or adjusted under 35 U.S.C. 154(b) by 41 days.

(21) Appl. No.: 13/645,453

(22) Filed: Oct. 4, 2012

(65) Prior Publication Data

US 2014/0098988 A1 Apr. 10, 2014

(51) Int. Cl.
*G06K 9/00* (2006.01)
*G06K 9/62* (2006.01)

(52) U.S. Cl.
CPC .......... *G06K 9/00281* (2013.01); *G06K 9/6209* (2013.01)

(58) Field of Classification Search
CPC ............. G06K 9/00281; G06K 9/6209; G06T 2207/10016; G06T 7/2006; G06T 7/2046
See application file for complete search history.

(56) References Cited

U.S. PATENT DOCUMENTS

| | | | |
|---|---|---|---|
| 5,805,745 A | 9/1998 | Graf | |
| 5,852,669 A | 12/1998 | Eleftheriadis et al. | |
| 6,600,830 B1 | 7/2003 | Lin et al. | |
| 7,058,209 B2 | 6/2006 | Chen et al. | |
| 7,254,256 B2 | 8/2007 | Chen et al. | |
| 7,454,039 B2 | 11/2008 | Tu et al. | |
| 7,460,693 B2 | 12/2008 | Loy et al. | |
| 7,536,044 B2 | 5/2009 | Zhou et al. | |
| 7,643,659 B2 | 1/2010 | Cao et al. | |
| 7,711,145 B2 | 5/2010 | Gallagher | |
| 8,027,521 B1 | 9/2011 | Moon et al. | |
| 8,121,347 B2 | 2/2012 | Metaxas et al. | |
| 2003/0053663 A1 | 3/2003 | Chen et al. | |
| 2005/0041867 A1 | 2/2005 | Loy et al. | |
| 2006/0148323 A1 | 7/2006 | Canzler et al. | |
| 2007/0230794 A1 | 10/2007 | McAlpine et al. | |
| 2009/0116749 A1 | 5/2009 | Cristinacce et al. | |
| 2011/0007174 A1 | 1/2011 | Bacivarov et al. | |
| 2012/0269436 A1* | 10/2012 | Mensink et al. | 382/180 |
| 2013/0044947 A1* | 2/2013 | Brandt et al. | 382/165 |
| 2013/0044958 A1* | 2/2013 | Brandt et al. | 382/201 |

OTHER PUBLICATIONS

U.S. Appl. No. 13/563,606, filed Jul. 31, 2012, Jonathan W. Brandt, et al.
U.S. Appl. No. 13/563,556, filed Jul. 31, 2012, Jonathan W. Brandt, et al.
U.S. Appl. No. 13/645,463, filed Oct. 4, 2012, Jonathan W. Brandt, et al.

(Continued)

*Primary Examiner* — Avinash Yentrapati
(74) *Attorney, Agent, or Firm* — Wolfe-SBMC

(57) ABSTRACT

Various embodiments of methods and apparatus for feature point localization are disclosed. An object in an input image may be detected. A profile model may be applied to determine feature point locations for each object component of the detected object. Applying the profile model may include globally optimizing the feature points for each object component to find a global energy minimum. A component-based shape model may be applied to update the respective feature point locations for each object component.

20 Claims, 9 Drawing Sheets

(56) References Cited

OTHER PUBLICATIONS

Timothy F. Cootes, Gareth J. Edwards and Christopher J. Taylor "Active Appearance Models" IEEE Transactions on Pattern Analysis and Machine Intelligence vol. 23 No. 6 Jun. 2001 pp. 681-685.

Stephen Milborrow "Active Shape Models with Stasm" www.mbo.users.sonic.net/stasm Accessed Oct. 12, 2012 pp. 1-3.

T.F. Cootes, C.J. Taylor, D.H. Cooper and J. Graham "Active Shape Models—Their Training and Application" Computer Vision and Image Understanding vol. 61, No. 1, Jan. 1995 pp. 38-59.

Leon Gu and Takeo Kanade "A Generative Shape Regularization Model for Robust Face Alignment" Computer Science Department Carnegie Mellon University pp. 1-14 Oct. 12-18, 2008.

Philp A Tresadern, Harish Bhaskar, Steve A Adeshina, Chris J Taylor, Tim F Cootes "Combining Local and Global Shape Models for Deformable Object Matching" Imaging Sciences and Biomedical Engineering, School of Cancer and Imaging Sciences, University of Manchester, Manchester M13 9PT, United Kingdom pp. 1-12, Sep. 2009).

Lin Liang, Rong Xiao, Fang Wen, Jian Sun "Face Alignment via Component-based Discriminative Search" Microsoft Research Asia Beijing, China pp. 1-14, Oct. 12-18, 2008.

Stephen Milborrow and Fred Nicolls "Locating Facial Features with an Extended Active Shape Model" Department of Electrical Engineering University of Cape Town, South Africa (www.milbo.users.sonic.net) pp. 1-11 Oct. 12-18, 2008.

U.S. Appl. No. 13/645,463, filed Oct. 4, 2012, Jonathan W. Brandt.

* cited by examiner

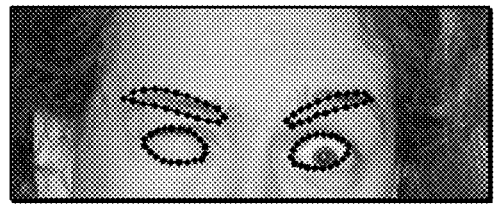
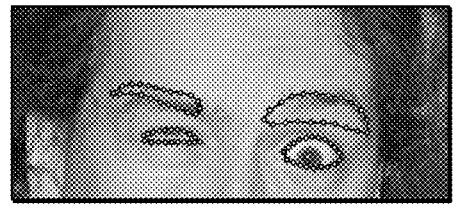
FIG. 4A  FIG. 4B
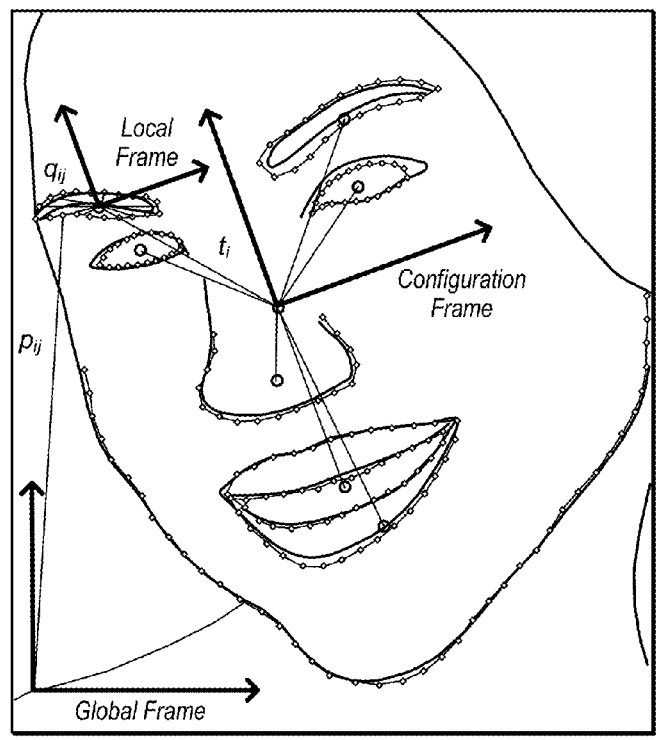
FIG. 5

FITTING CONTOURS TO FEATURES

BACKGROUND

The profusion of inexpensive digital cameras has enabled the creation of a much broader universe of digital image content. New market entrants are now able to bring image capture to environments and events for which such image capture was previously considered cost prohibitive or technically unfeasible. In the past few decades, cameras have become smaller and more robust, and therefore portable to environments where photography was previously considered to be extremely difficult due to either the harshness of the environment or the inconvenience of introducing the camera equipment form factor into the space where the camera was desired. Therefore, images may commonly include conditions such as extreme pose, lighting, and expression. Typical methods used to localize facial feature components in an image, such as standard active shape model (ASM), do not handle such conditions well.

SUMMARY

Various embodiments of methods and apparatus for feature point localization are disclosed. In one embodiment, an object in an input image may be detected. A profile model may be applied to determine locations of a plurality of feature points for each component of the detected object. Applying the profile model may include globally optimizing the feature points for each object component to find a global energy minimum. A component-based shape model may be applied to update the respective feature point locations for each object component.

BRIEF DESCRIPTION OF THE DRAWINGS

FIGS. 4A-B illustrate a comparison of shape fitting by classic ASM and the disclosed techniques, according to some embodiments.

FIG. 5 illustrates the disclosed component-based model, according to some embodiments.

Figure 1:
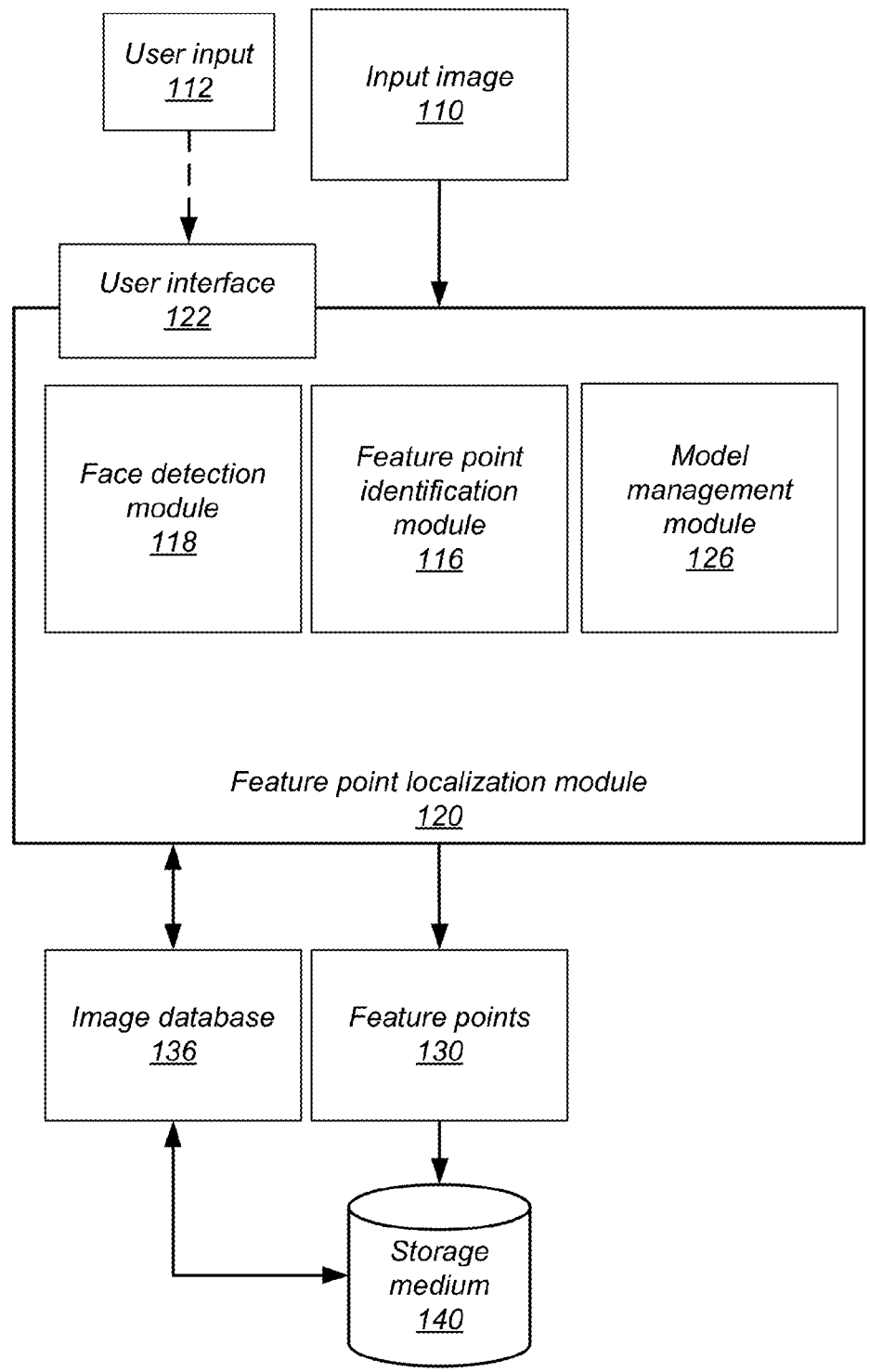
FIG. 1 illustrates a feature point localization module that may implement feature point localization, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a component of an object of an image, the terms "first" and "second" feature points can be used to refer to any two feature points of the object component. In other words, the "first" and "second" feature points are not limited to logical feature points 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

In some embodiments, the disclosed feature point localization techniques may be used for photograph editing (e.g., opening eyes, red eye removal, highlighting lips, making a smile, retouching, etc.), object (e.g., face) recognition, object (e.g., face) tracking, and/or expression analysis, among many other applications. As one non-limiting example, the disclosed techniques may result in determined landmark feature point locations of a face in an image. The determined landmark feature point locations may then be usable to generate one or more masks for various components of the face. The masks may allow users to apply retouching effects on specific facial regions/components in a manner that reduces the level of user interaction needed. Although certain embodiments and applications are discussed in the field of facial feature localization, it should be noted that the same or similar principles may also be applied in other fields (e.g., general object feature localization, fitting contours to a deformable object, etc.).

Various embodiments of methods and apparatus for feature point localization are presented. Some embodiments include a means for feature point localization in an input image. For example, a feature point localization module may detect an object in an input image, as described herein. The feature point localization module may then apply a profile model to determine feature point locations for each object component in the detected object. Applying the profile model may include globally optimizing the feature points to find a global energy minimum. The feature point localization module may also apply a component-based shape model to update the respective feature point locations for each object component. In some embodiments, the feature point localization module may receive input to move one of the feature points to a fixed location. The feature point localization module may then automatically adjust other feature points to different locations based on the moved feature point. The feature point localization module may in some embodiments be implemented by a non-transitory, computer-readable storage medium and one or more processors (e.g., CPUs and/or GPUs) of a computing apparatus, including a handheld computing device. The computer-readable storage medium may store program instructions executable by the one or more processors to cause the computing apparatus to perform the techniques described herein. Other embodiments of a feature point localization module may be at least partially implemented by hardware circuitry and/or firmware stored, for example, in a non-volatile memory.

Figure 12:
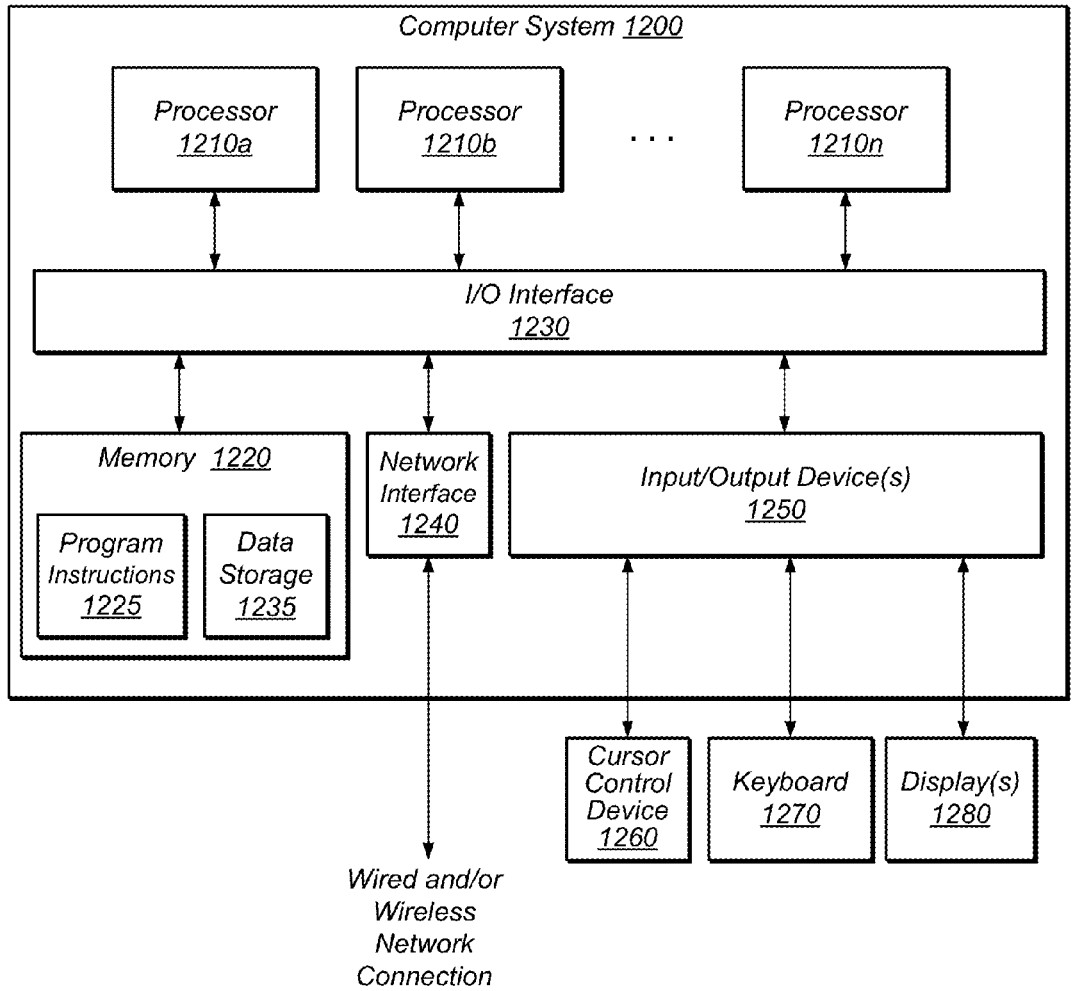
FIG. 12 illustrates an example computer system that may be used in embodiments.

FIG. 1 illustrates a feature point localization module that may implement feature point localization, according to some embodiments. Feature point localization module 120 may, for example, implement feature point localization, as described herein. FIG. 12 illustrates an example computer system on which embodiments of feature point localization module 120 may be implemented. Feature point localization module 120 may receive, as input, one or more input images 110.

Feature point localization module 120 may receive user input 112 via user interface 122, as described herein. For example user input 112 may be received to manually move a feature point to a fixed location. Feature point localization module 120 may then automatically move nearby feature points based on the manually moved feature point. Additional user input 112 may be received to move another feature point to a fixed location upon which its nearby feature points may be automatically adjusted. In some embodiments, once the feature points have been localized, additional user input 112 may be received to edit the image. Feature point localization module 120 may generate as output feature points 130. Feature points 130 may, for example, be stored to a storage medium 140, such as system memory, a disk drive, DVD, CD, etc.

Embodiments of feature point localization module 120 may include a face detection module 118 for detecting a face in input image 110. Embodiments of feature point localization module 120 may include a feature point identification module 116 for identifying feature points of a face in input image 110.

Image database 136 may include a training image data set that includes images together with annotated feature point locations. In some embodiments, the off-line training process is as follows. For each training set image, the face detector is applied, which returns a detection window around the face. The positions of the feature point locations relative to the detection window for that training instance are recorded. These locations are averaged over all training instances to determine the mean locations of the feature points relative to the face detection window. For a new image (not in the training set), the face detection window is used to predict the initial locations of the feature points.

Specifically, in some embodiments a template profile is determined for each feature point from the training data. The template profile for a particular feature point consists of a set of samples of the grayscale gradient of the image extending perpendicularly to the contour to which the feature point belongs. Typically, embodiments sample 10 gradient values in each direction, forming a vector of 20 components to represent the grayscale appearance changes at that feature point. These vectors are normalized to unit magnitude to compensate for variations in illumination. The relative fit of a particular location is quantified as the Mahalanobis distance of the corresponding profile template to the mean profile template for that feature point. During the iterative search process, the appearance search consists of sampling a range of offsets perpendicularly from the current location and identifying the offset position that minimizes the Mahalanobis distance. This search is done independently for each feature point. The new location for each feature point is the location that minimizes this distance among the set of possible locations tested. During the subsequent shape fitting steps, the feature points are further moved to be consistent with the face shape. The parameters for the Mahalanobis distance computation include the mean profile value and the covariance matrix for the profile values for each feature point. These parameters are determined during an off-line training process.

In some embodiments, face detection module 118 performs detecting a face in an input image 110. A feature point identification module 116 performs detecting independent sets of feature points for respective facial feature components. In some embodiments, the detecting the independent sets of feature points for the respective facial feature components by feature point identification module 116 includes detecting the independent sets of feature points for the respective facial feature components using a component-based active shape model for facial feature localization.

In some embodiments, feature point identification module 116 performs presenting the candidate feature point locations through user interface 122, receiving user modifications of the feature point locations, and updating others of the feature point locations based on the user modifications.

In some embodiments, face detection module 118 performs detecting a face in an input image 110. A feature point identification module 116 performs estimating one or more transformation parameters for the detected face based on a profile model, applying the profile model to obtain a set of feature points for each facial component of the detected face, and applying global and component-based shape models to generate feature point locations of the each facial component of the detected face. Some embodiments iterate the applying the profile model and the applying the global and component-based shape models until a change in the feature point locations is less than a threshold and present the feature point locations to a user. In some embodiments, applying the profile model includes globally optimizing the feature points to find a global energy minimum. For example, a distance between adjacent feature points may be constrained to help smooth the fit to the shape contour.

In some embodiments, model management module 126 performs generating the profile model from the training image data set. In some embodiments, the estimating the transformation parameters performed by feature point identification module 116 includes calculating a translation parameter, a scale parameter and a rotation parameter of the detected face relative to the profile model. In some embodiments, feature point identification module 116 performs presenting the feature point locations, receiving user input representing corrections to selected ones of the feature point locations, and iterating the applying the profile model and the applying the global and component-based shape models until a change in the feature point locations is less than a threshold, with respect to which the iterating the applying the profile model and the applying the global and component-based shape models further includes treating the corrections to the selected ones of the feature point locations as fixed locations for the selected ones of the feature point locations.

Figure 2:
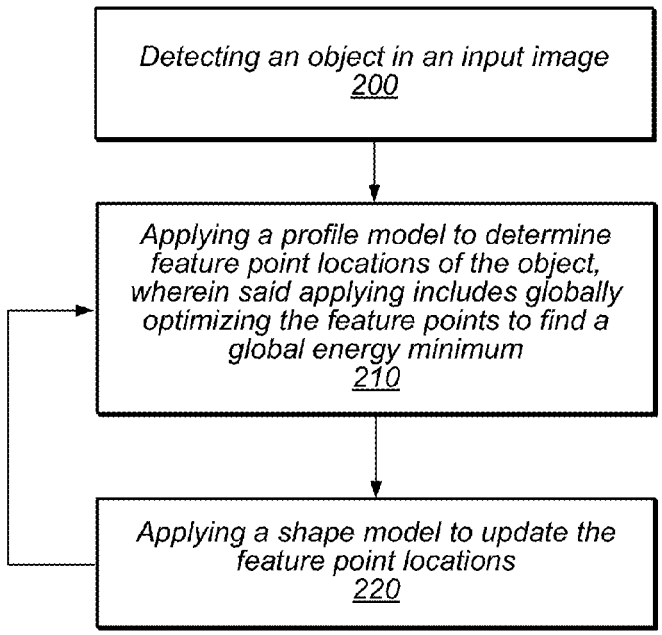
FIG. 2 is a flowchart that illustrates a method for feature point localization, according to some embodiments.

Turning now to FIG. 2, one embodiment of feature point localization is illustrated. While the blocks are shown in a particular order for ease of understanding, other orders may be used. In some embodiments, the method of FIG. 2 may include additional (or fewer) blocks than shown. Blocks 200–220 may be performed automatically or may receive user input. In one embodiment, the feature point localization module of FIG. 1 may implement the method of FIG. 2.

As shown at 200, an object in an input image may be detected. For example, in one embodiment, a face may be detected. A face detector may generate a face rectangle with initialized feature points by placing the mean shape (e.g., the average of aligned shapes for training faces from a training set, where alignment may be done by fitting with similarity transformation) to the detected face frame.

As illustrated at 210, a profile model may be applied to determine feature point locations for a number of feature points for each object component of the detected object. Applying the profile model may include globally optimizing the plurality of feature points for each object component to find a global energy minimum. Such a global optimization may help ensure that neighboring feature points are at an appropriate distance from one another. At each landmark feature point, the profile model may be the normalized gradient vector in the direction orthogonal to the shape boundaries. The profile distance may be computed as the Mahalanobis (or comparable) distance over the training set.

In various embodiments, determining the feature point locations may include using a training set of high resolution example images. One example training set includes portraits of faces in a variety of poses, lighting, expression, and occlusion. To create the training set, a face detector was run on a candidate image set to identify a subset of images that contain sufficiently large faces (e.g., greater than 500 pixels in width). The subset was further filtered by hand to remove false positives, profile views, as well as low quality images. For each accepted face, a cropped version of the original image was generated such that the cropped version includes the face and a proportional amount of background. In some images, the face is not centered in the cropped image. Additionally, some cropped images include multiple faces instances (e.g., a group photograph). The images in the training set were hand-annotated to precisely locate the eyes, nose, eyebrows, and jawline. The example training set includes 2000 training and 330 test images with highly accurate, detailed, and consistent annotations of the primary facial components.

In various embodiments, globally optimizing the plurality of feature points may include constraining a distance between adjacent feature points. As one example, it may include jointly fitting feature point locations by finding the sequence of candidate locations with a maximum sum of unary score (e.g., at each candidate location) and binary scores (e.g., at each pair of adjacent locations). The relative contribution of the unary and binary scores may be weighted so that the desired tradeoff between respecting the image feature (the unary term), and the smoothness constraint (the binary term) can be balanced appropriately. Each unary score may be a probability of a candidate location of a given feature point. The unary score may defined as:

$$p_i = (1-d_i)/(M-1) \qquad \text{Eqn. (1)}$$

where $d_i$ is the Mahalanobis (or comparable) distance at the candidate location. $d_i$ may be normalized such that $\Sigma_i^M(d_i)=1$, which may ensure that $\Sigma_i^M(p_i)=1$.

Each binary score may be a probability that two adjacent feature points are a given distance x apart. In one embodiment, the binary score may be modeled as a continuous Poisson:

$$p(x) = \frac{\lambda^x e^-}{\Gamma(x+1)} \qquad \text{Eqn. (2)}$$

where x is the Euclidean (or comparable) distance between the two locations and $\Gamma$ is the gamma function. The Poisson distribution may have a suitable probability distribution function and a single parameter $\lambda$ that can be fit separately for each object component.

In one embodiment, globally optimizing the plurality of feature points for each object component may include applying a dynamic programming technique (e.g., Viterbi algorithm). In such an embodiment, the global optimization may find the sequence of candidate locations having a maximum sum of unary and binary scores in $O(NM^2)$ time where N is the number of landmark feature points and M is the number of candidate locations for each point.

Figure 6A:
FIGS. 6A-B illustrate a comparison of profile searches by the greedy method of classic ASM and the disclosed techniques, according to some embodiments.
Figure 6B:

In one embodiment, to find the globally optimized set of candidate locations, the Viterbi algorithm may be run, which maximizes the sum of the log probabilities of the unary and binary scores. An example comparing the profile search results of a greedy method of classic active shape model (ASM) and the disclosed globally optimized techniques is shown in FIG. 6A (greedy) and FIG. 6B (disclosed technique). The disclosed technique outperforms the greedy method, quite noticeably so in the lips and nose.

At 220, a shape model (e.g., a component-based shape model) may be applied to update the respective feature point locations for each object component of the detected object. In one embodiment, the global shape model includes the statistics of the global shape vector for the training set, and may be represented as a principal component analysis (PCA) linear subspace. The disclosed component-based ASM, which may better handle the wide variation that exists in natural face images, includes modeling the shape variation of each object component independently, up to a similarity transformation, and encoding the relative positions of the object components by a configuration model. A comparison of classic ASM versus the disclosed component-based technique is shown in FIGS. 4A and 4B. Note that in FIG. 4A, the bigger left eye constraints the right eye and the tilted right brow pulled the left brow off the correct location. Better fitting results are shown in FIG. 4B, according to the disclosed techniques.

For applications where the object is a face, the facial landmark feature point set may be considered a union of seven components: jawline, nose, lips, left eye, right eye, left brow, and right brow. Each component may have its own coordinate frame called a local frame, which is centered at the center of mass of the component. The component centers are successively represented in a higher level canonical face frame called the configuration frame. An illustration of the component-based model is shown in FIG. 5.

In one embodiment, the component-based model includes three coordinate frames: global, configuration, and local frames. The j-th feature point of component i has its global coordinates $p_{ij}$ on the global coordinate frame, and local coordinates $q_{ij}$ on the local coordinate frame. In the local frame, the coordinates of feature points for a component may be represented as a single shape model centered at the component's centroid. It may be represented as a combination of principal vectors by PCA:

$$q_i = \bar{q}_i + \Phi_i b_i \quad \text{Eqn. (3)}$$

where $q_i$ is the concatenation of $q_{ij}$, and $\bar{q}_i$ and $\Phi_i$ are the mean vector and the shape basis learned from the training data, respectively, and where $b_i$ denotes the set of linear coefficients of the fitting.

In the configuration frame, the location of each component's centroid may be represented by a displacement vector $t_i$ from the face center. To model the variation in face configuration, a PCA may also be learned for the configuration vector t (concatenation of $t_i$ for all components), which results in the linear subspace representation:

$$t = \bar{t} + \phi r \quad \text{Eqn. (4)}$$

where $\phi$ is the set of configuration bases, and r denotes the set of PCA coefficients.

The global coordinates of the feature points can be obtained from local coordinate and configuration coordinates by a similarity transform:

$$p_{ij} = sR(q_{ij} + t_i) + t_0 \quad \text{Eqn. (5)}$$

where R, s, and $t_0$ denote the rotation, scale, and translation that align a facial shape from the global frame with the configuration frame. $t_i$ denotes the location coordinates of component i in the configuration frame. While $t_i$ differs from component to component, the three similarity transform parameters in s and R may be shared among the components.

Taking the mean of Eqn. (5) for each component yields $\bar{p}_i = sR(\bar{q}_i + t_i) + t_0$, where $\bar{q}_i$ is the local coordinate of the centroid of component i and is effectively zero. By making it zero, the mean of Eqn. (5) for each component may be rewritten as $\bar{p}_i = sRt_i + t_0$. Further combining the equation for all components, the model can be written in concatenated form as:

$$\bar{p} = sRt + t_0 \quad \text{Eqn. (6)}.$$

Equations (6) and (4) may be directly used for configuration fitting in Algorithm 1, described below.

The configuration model may constrain relative locations between object components and may be responsible for finding the orientation and scale of the object and estimating the optimal locations of components. The local model for each component may be responsible for optimally fitting the component's shape model to the observation. Because each local model may be fitted independently, the model can handle larger global shape variations. Moreover, in some embodiments, because each component shape may be a single connected contour, the disclosed joint optimization of multiple feature points in the profile model may be performed.

In one embodiment, applying the profile and component-based shape model may be repeated. For example, the profile and shape models may be applied in an interleaved, iterative way in a coarse-to-fine manner. At each iteration, the profile may be applied first (e.g., at 210), which may result in the suggested candidate locations of the feature points. The feature point candidates may then be regularized by the local shape model. Such application of the models may be repeated until convergence. For instance, iteration may occur until a change in the feature point locations is less than a threshold (e.g., by the percentage change in the distance amount, by the change in the distance amount, etc.). In another example, application of the models may be repeated for a certain number of iterations.

In one embodiment, the method of FIG. 2 may be included as part of an example algorithm, Algorithm 1, for facial feature localization. Algorithm 1 follows:

Detect faces, initialize the shape model based on the face rectangle for each resolution level do
    repeat
      a. Do profile search for suggesting new feature point locations
        a1. Collect unary scores by profile matching
        a2. Jointly find optimal path using the Viterbi algorithm
      b. Update the feature point locations with local shape and conf. model
        b1. Find the centroid of suggested feature points for each component
        b2. Fit the centroids to the configuration model using Eqns. 4 and 6
        b3. Apply the new configuration to the suggested feature points using Eq.3
        b4. Fit the local shape model PCA subspace to feature points using Eq.1
      c. Form a new global shape by applying the inverse similarity transformation
    until Number of points moved between two consecutive rounds <20%
    Map the localized result to the next resolution level
end for
Return the result from the highest resolution level In one embodiment, input may be received to correct one or more feature point locations. Applying the profile and component-based shape model may then be repeated with the corrected one or more feature point locations being fixed point locations. The result of the repeat application of the profile and component-based shape model includes updated feature point locations other than the fixed point locations. Further detail for one example of an embodiment for receiving input to correct one or more feature point locations and repeating application of the profile and shape model is described in the method of FIG. 3.

Figure 3:
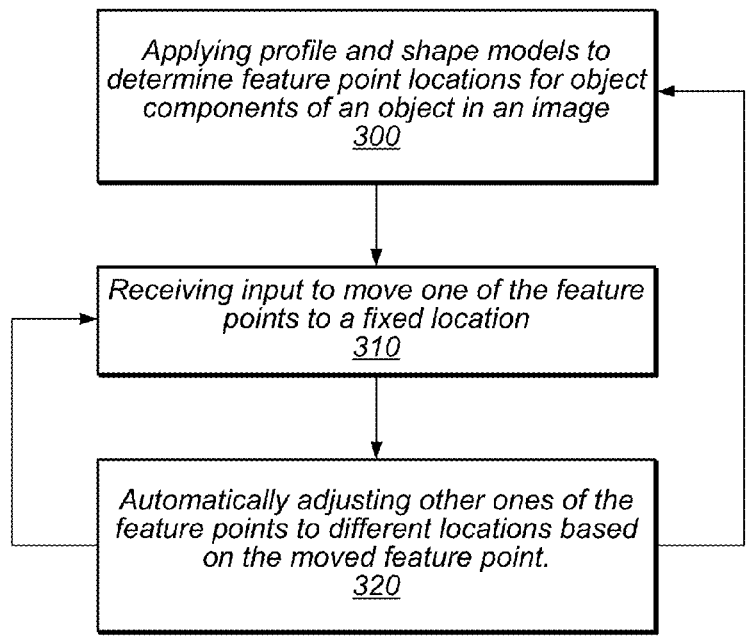
FIG. 3 is a flowchart that illustrates a method for feature point localization, according to some embodiments.

Turning now to FIG. 3, one embodiment of feature point localization is illustrated. While the blocks are shown in a particular order for ease of understanding, other orders may be used. In some embodiments, the method of FIG. 3 may include additional (or fewer) blocks than shown. Blocks 300-320 may be performed automatically or may receive user input. The method of FIG. 3 may be used in conjunction with the method of FIG. 2. Accordingly, a combination of some or all of the blocks of FIGS. 2-3 may be used in some embodiments. In one embodiment, the feature point localization module of FIG. 1 may implement the method of FIG. 3.

As shown at 300, a profile model and a shape model may be applied to an object of an image to determine feature point locations for a plurality of feature points for each object component of the image. In one embodiment, the object may be a face.

At 310, input may be received to move one of the feature points to a fixed location. In one embodiment, input may be received via user interface 122. In one embodiment, a user may be instructed, via user interface 122, to move the feature point with the largest error to its correct location.

As illustrated at 320, other ones of the feature points may be automatically adjusted to different locations based on the moved feature point. For example, the features points that may be automatically adjusted to different locations may be feature points that are within a threshold of the feature point moved at block 310. For example, feature points that are within a distance threshold of the moved point may be automatically adjusted. As another example, feature points that are within a certain number of points of the moved point (e.g., within 3 feature points on one or both sides of the moved point) may be automatically adjusted.

In one embodiment, the moved feature point and the feature points that are adjusted at 320 may be from the same object component. For example, if the moved feature point was from the lip of a face, then the automatically adjusted points may also be from the lip.

In some embodiments, automatically adjusting the other feature points may include moving them in the same direction that the one feature point was moved. It may also include moving them by an amount proportional to the respective other ones' proximity to the moved point. Consider an example in which feature point A is moved. The three closest points on either side of feature point A may also be moved/adjusted in the same direction feature point A was moved. The amount by which those closest points are adjusted may be linearly scaled based on how close each of those respective closest points is to feature point A. For instance, if feature point A was moved 1 unit to the right, the points next to feature point A, on either side of feature point A, may each be moved 0.75 units to the right. The next points on either side of feature point A may be moved 0.5 units and 0.25 units to the right, respectively. And the fourth point from feature point A, on either side of feature point A, may not be automatically adjusted. In one embodiment, a previously user-corrected moved point is a fixed point in that it may not be automatically adjusted at 320. For example, if the third point to the right of the moved point was a previously moved point, the linear scaling of the automatically adjusted points will more rapidly converge to zero in the example above. Another example is described below at FIG. 7.

In one embodiment, when a feature point $p_i$ is moved, the neighboring feature points on the same contour as $p_i$ may be moved along the same direction. The amount of movement for the neighboring feature points may be proportional to their proximity to $p_i$. For example, consider the feature points $p_a$ and $p_b$ on both sides of $p_i$. $p_a$ and $p_b$ define the span of feature points that may be automatically adjusted at block 320. Each feature point with index $j \in (a,i)$ moves by $$\frac{a-j}{a+j} * d$$

where d is a displacement (e.g., user-specified) vector of $p_i^3$. In one embodiment, the feature point $p_a$ may be specified as the closest along the contour to $p_i$ of the following three feature points: (1) the one [n/4] feature points away, wherein n is the number of feature points in the component, (2) the nearest corrected (e.g., user-corrected) feature point, and (3) the end feature point if the component contour is open. The feature point $p_b$ on the other side of the contour may be determined analogously.

Figure 7:
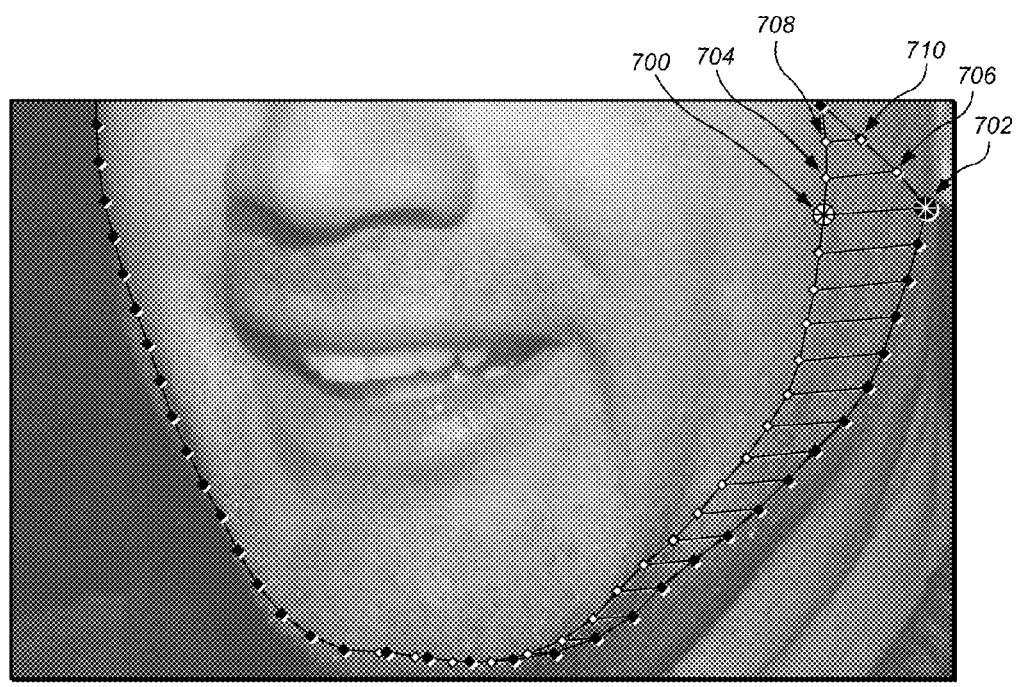
FIG. 7 illustrates an example of a linearly scaled movement, according to some embodiments.

An illustration of an example of moving a feature point and automatically adjusting others is shown in FIG. 7. As shown in FIG. 7, a feature point in the jawline of a face is moved from location 700 to location 702. The feature points at locations 704 and 708 are automatically adjusted to locations 706 and 710, respectively. The distance at which the feature points are relocated from locations 700, 704, and 708 is linearly scaled such that the further from the moved feature point, the less the amount another feature point is automatically adjusted. In the example of FIG. 7, the amount by which the feature point moved from location 700 to location 702 is the largest amount, with the movement from location 704 to 706 being less than the movement from location 700 to 702. And the adjustment from location 708 to 710 is less than the movement from 700 to 702 and less than the adjustment from 704 to 706.

Additional input may be received to move another one of the feature points to a fixed location. At least some of the feature points not having fixed locations may be automatically adjusted. Blocks 310 and 320 may be repeated a number of times. For example, where the input at 310 is received via a user interface, a user may provide additional input indicating that the results are satisfactory. Such additional input may be provided after moving one point, two points, five points, or any number of points. Moreover, by performing the automatic adjustment of other points at block 320, it may reduce the number of iterations until the results are satisfactory. In some instances, the neighboring points of the moved point(s) have been adjusted such that they are close enough to the real curve that their profile models can snap to the right locations.

Applying the profile and shape models may be repeated based on the moved feature point and the automatically adjusted feature points. The result of repeating application of the profile and shape models includes updating at least some feature point locations other than the fixed location(s). Thus, in some embodiments, the fixed components are fixed in that they do not move unless manually moved again via input at 310.

In one embodiment, repeating the application of the profile and shape models may be performed for only the object component that includes a moved feature point. For example, if input was received at 310 to move a feature point of the lip, then application of the profile and shape models may only be repeated for the lip. In some embodiments, multiple iterations of component-based ASM fitting may occur at the highest resolution for that object component. Note, however, if input is received to move at least one feature for each object component, then application of the profile and shape models may be repeated for each object component. As described at FIG. 2, applying the profile and shape models may be performed by iterating between shape model and profile model fitting. During the shape model fitting, a constrained linear least squares technique may be used to find the location of the component given its constraint of going through the fixed feature points. In the profile fitting, as described herein, candidate locations may be specified for each feature point and the dynamic programming technique may find the contour. For feature points that are corrected to fixed locations at block 310, the fixed location is used as the only candidate location for that feature point thereby forcing the dynamic programming technique to find a path through the fixed location feature point(s).

The disclosed techniques may localize feature points in a reliable and accurate manner under a broad range of appearance variation, such as pose, lighting, expression, occlusion, and individual differences. In contrast to a greedy algorithm where each feature point location is chosen independently of its neighbors with neighboring feature points potentially ending up far from each other, the disclosed techniques may help ensure that adjacent feature points are an appropriate distance from one another. Moreover, the automatic adjustment based on manually moved feature points may reduce the amount of user interaction to generate accurate results.

Example Results

The disclosed technique may allow for high independence and freedom in component shape so that it may deal with natural photographs having higher variations than studio data. The disclosed technique was compared with other techniques with studio data as well as photos having higher variations. The results of those comparisons follow.

In the first comparison, the disclosed technique was compared with the STASM algorithm. The disclosed technique was trained on a training dataset (MUCT dataset) that includes 3755 images of 276 subjects taken in a studio environment. The disclosed technique and the STASM algorithm were then tested on a test dataset (BioID dataset) that includes 1521 frontal images of 23 different test persons taken at the same lighting. The training and test datasets include point sets that include five standalone points. Therefore, for this comparison, the Viterbi optimized profile searching was not used for this comparison. Performance of the disclosed technique and STASM was evaluated using the me-17 measure. The me-17 measure is the mean of distance between the fitting result of 17 points in the face to the manually marked ground truth divided by the distance between two eye pupils. The performance comparison between the disclosed technique and STASM is illustrated in Table 1. The results show that both algorithms' results on BioID are close to perfect with STASM having slightly lower error.

| Dataset | Technique | Mean | Median | Min | Max |
|---|---|---|---|---|---|
| MUCT/BioID | STASM | 0.043 | 0.040 | 0.020 | 0.19 |
| MUCT/BioID | CompASM/Greedy | 0.045 | 0.043 | 0.021 | 0.23 |
| Helen | STASM | 0.111 | 0.094 | 0.037 | 0.411 |
| Helen | CompASM/Greedy | 0.097 | 0.080 | 0.035 | 0.440 |
| Helen | Disclosed Technique | 0.091 | 0.073 | 0.035 | 0.402 |

Figure 8:
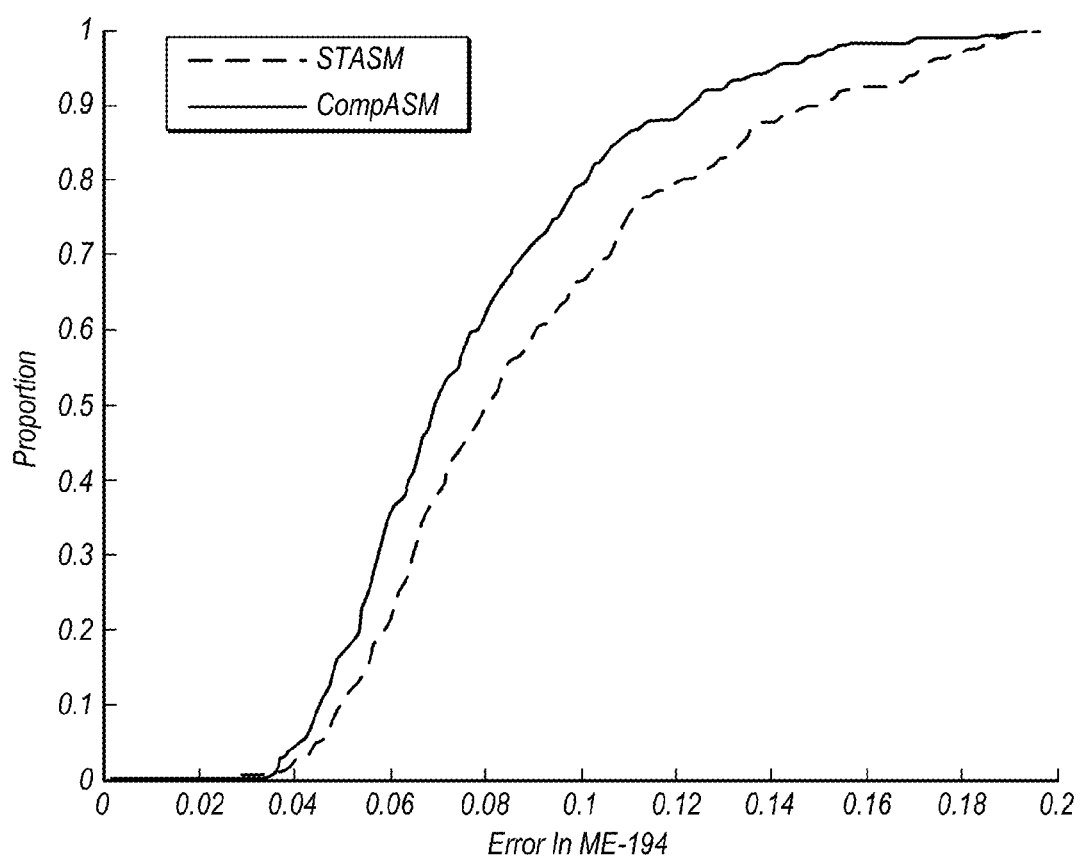
FIG. 8 illustrates a graph comparing test results of various techniques, including the disclosed techniques.
Figure 9A:
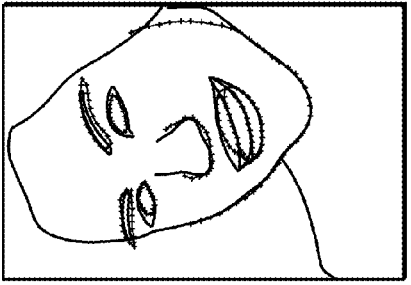
FIG. 9A-9F illustrate example fitting results for the disclosed techniques and STASM.
Figure 9B:
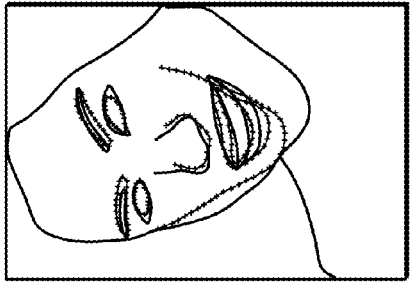
Figure 9C:
Figure 9D:
Figure 9E:
Figure 9F:
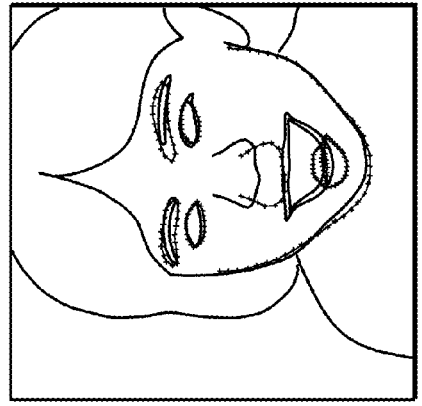

The second comparison used a dataset, referred to as the Helen dataset, which includes natural images that vary in pose and lighting and are diverse in subject identities and expression. The face features of this dataset are highly uncorrelated with non-Gaussian distribution, which the disclosed technique is better at exploiting. To measure fitting performance on the Helen dataset, the me-194 measure was used, which calculates the mean deviation of 194 points from ground truth normalized by the distance between two eye centroids. The Helen dataset was divided into a training set of 2000 images and a testing set of 330 images. The comparison of STASM and CompASM is shown in Table 1 and FIG. 8. Table 1 shows that CompASM outperforms STASM by 16%. The results indicate that CompASM is more robust than STASM over diverse face images. Some examples of fitting results of STASM and disclosed techniques are shown in FIGS. 9A-F. FIGS. 9A, 9C, and 9E illustrate fitting results using the disclosed techniques, which outperform the fitting results using STASM as shown in FIGS. 9B, 9D, and 9F.

Figure 10:
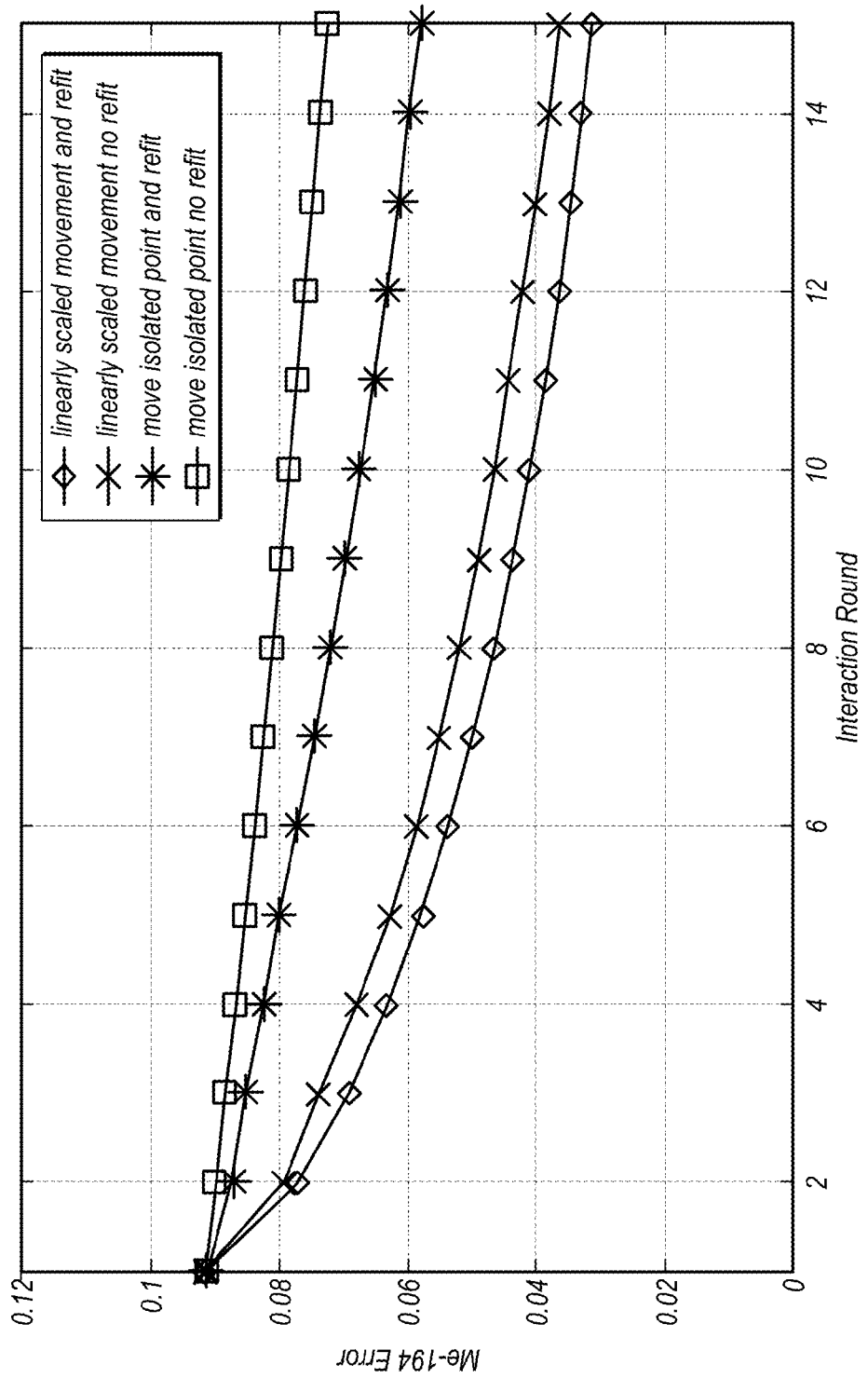
FIG. 10 illustrates a graph comparing test results of various techniques, including the disclosed techniques.
Figure 11A:
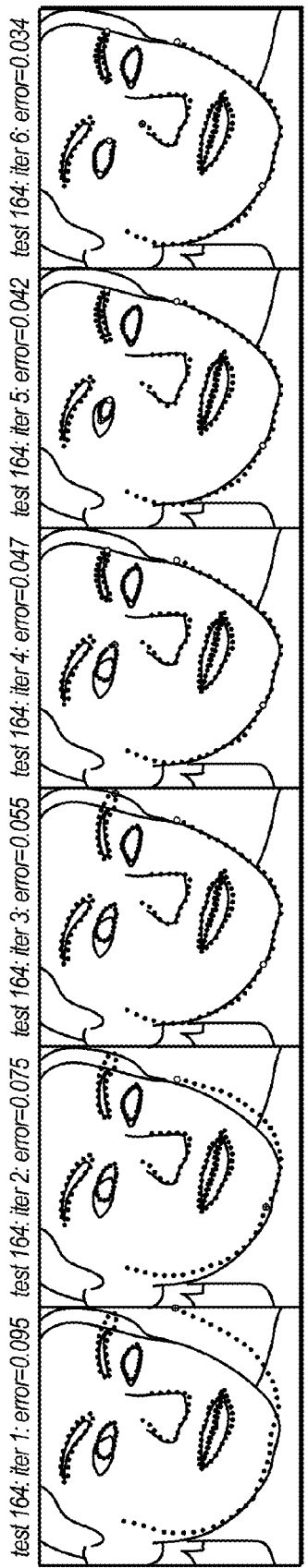
FIGS. 11A-B illustrate example sequences where the most erroneous point is selected at each iteration, according to some embodiments.
Figure 11B:
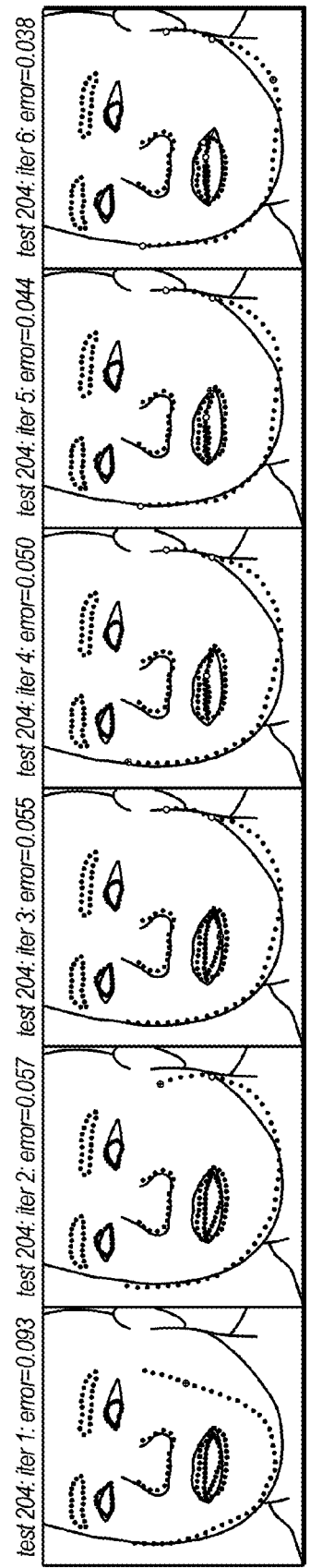

The refinement of the automatically determined facial component locations through user interaction, as described in FIG. 3, was also evaluated. A user's typical behavior when interacting with the fitting system was simulated. Accordingly, the landmark feature point located farthest from its true position was chosen and moved to its true position. Once such a point was selected and moved, the point becomes a constraint for subsequent fitting rounds, as described herein. The moving of a point and subsequent fitting was repeated for a number of rounds and the me-194 error was measured at each round. FIG. 10 illustrates the distribution of the error across the test dataset over 15 interactivity rounds. To evaluate both linearly scaled movement and constrained refitting, the performance of one of linearly scaled movement or constrained refitting was compared with the performance of both linearly scaled movement and constrained refitting. Those evaluations were also compared with a baseline where only the most erroneous point was moved. From FIG. 10, it is apparent that using both linearly scaled movement and constrained refitting is the most effective at reducing overall error quickly. Each curve of FIG. 10 is the mean value across the test set under varying conditions. FIGS. 11A and B depict example sequences of the refinement technique, with the improvements shown from left to right. FIGS. 11A-B represent a sequence of refinements where the most erroneous point was selected at each refinement.

FIG. 12 illustrates an example computer system that may be used in embodiments. Embodiments of a feature point localization module using feature point localization techniques as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of feature point localization are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of a feature point localization as described herein, and data storage 1235, comprising various data accessible by program instructions 1225. In one embodiment, program instructions 1225 may include software elements of embodiments of feature point localization as illustrated in the above Figures. Data storage 1235 may include data that may be used in embodiments. In other embodiments, other or different software elements and data may be included.

Those skilled in the art will appreciate that computer system 1200 is merely illustrative and is not intended to limit the scope of feature point localization as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
   detecting an object in an input image;
   receiving an input to move a feature point of the object to a fixed location;
   applying a profile model to determine feature point locations for a plurality of feature points for each object component of the detected object, said applying the profile model includes adjusting respective feature point locations of the plurality of feature points based on the fixed location of the moved feature point, and includes globally optimizing the plurality of feature points for each object component to find a global energy minimum, said globally optimizing the plurality of feature points includes maximizing a weighted sum of a plurality of unary scores and a plurality of binary scores of the plurality of feature points; and
   applying a component-based shape model to update the respective feature point locations for each object component of the detected object.

2. The method of claim 1, wherein said globally optimizing the plurality of feature points for each object component includes constraining a distance between adjacent feature points.

3. The method of claim 1, wherein said globally optimizing the plurality of feature points includes applying a dynamic programming technique.

4. The method of claim 1, wherein each unary score of the plurality of unary scores is a probability likelihood of a candidate location of a given feature point.

5. The method of claim 1, wherein each binary score is a probability likelihood that two adjacent feature points are a given distance apart.

6. The method of claim 1, wherein the plurality of unary scores includes a unary score at each candidate location for a given feature point, and wherein the plurality of binary scores includes a binary score for each pair of adjacent feature points.

7. The method of claim 1, wherein at least some of the plurality of feature points are at fixed locations.

8. The method of claim 1, further comprising:
   receiving input to correct one or more of the feature point locations; and
   repeating said applying the profile model and said applying the component-based shape model, wherein the corrected one or more feature point locations are fixed point locations for said repeating, wherein said repeating results in updating feature point locations other than the fixed point locations.

9. The method of claim 1, further comprising:
   repeating said applying the profile model and said applying the component-based shape model until a change in the feature point locations is less than a threshold.

10. A non-transitory computer-readable storage medium storing program instructions that are computer-executable to implement a computing device performing operations comprising:
    detecting a face in an input image;
    receiving an input to move a feature point of the face to a fixed location;
    applying a profile model to determine feature point locations for a plurality of feature points for each facial component of the detected face, said applying the profile model includes adjusting respective feature point locations of the plurality of feature points based on the fixed location of the moved feature point in the face of the input image, and includes globally optimizing the plurality of feature points for each facial component to find a global energy minimum, said globally optimizing the plurality of feature points includes maximizing a sum of scores of the plurality of feature points, where each of at least some of the scores is a probability likelihood that two adjacent feature points are a given distance apart; and
    applying a component-based shape model to update the respective feature point locations for each facial component of the detected face.

11. The non-transitory computer-readable storage medium of claim 10, wherein said globally optimizing the plurality of feature points for each object component includes constraining a distance between adjacent feature points.

12. The non-transitory computer-readable storage medium of claim 10, wherein the at least some of the scores include the probability likelihood that two adjacent feature points are a given distance apart for each pair of adjacent feature points.

13. The non-transitory computer-readable storage medium of claim 10, wherein the program instructions are further computer-executable to implement:
   repeating said applying the profile model and said applying the component-based shape model based on input to correct one or more of the feature point locations, wherein the corrected one or more feature point locations are fixed point locations for said repeating, wherein said repeating results in updating feature point locations other than the fixed point locations.

14. A system, comprising:
   at least one processor; and
   a memory comprising program instructions that are executable by the at least one processor to:
   detect a face in an input image;
   receive an input to move a feature point of the face to a fixed location;
   apply a profile model to determine feature point locations for a plurality of feature points for each facial component of the detected face, the profile model being applied includes adjusting respective feature point locations of the plurality of feature points based on the fixed location of the moved feature point in the face of input image, and includes globally optimizing the plurality of feature points for each facial component to find a global energy minimum, said globally optimizing the plurality of feature points includes maximizing a sum of scores of the plurality of feature points, where each of at least some of the scores is a probability likelihood that two adjacent feature points are a given distance apart; and
   applying a component-based shape model to update the respective feature point locations for each facial component of the detected face.

15. The system of claim 14, wherein said globally optimizing the plurality of feature points for each object component includes constraining a distance between adjacent feature points.

16. The system of claim 14, wherein the at least some scores include the probability likelihood that two adjacent feature points are a given distance apart for each pair of adjacent feature points.

17. The system of claim 14, wherein the program instructions are further executable by the at least one processor to perform:
   repeating to said apply the profile model and said apply the component-based shape model based on input to correct one or more of the feature point locations, wherein the corrected one or more feature point locations are fixed point locations for said repeating, wherein said repeating results in updating feature point locations other than the fixed point locations.

18. The method of claim 1, wherein the global energy minimum is utilized to position neighboring feature points at an appropriate distance from one another.

19. The non-transitory computer-readable storage medium of claim 10, wherein the global energy minimum is utilized to position neighboring feature points at an appropriate distance from one another.

20. The system of claim 14, wherein the global energy minimum is utilized to position neighboring feature points at an appropriate distance from one another.

* * * * *